United States Patent [19]

Yamanoi et al.

[11] Patent Number: 4,867,733
[45] Date of Patent: Sep. 19, 1989

[54] CHAIN DRIVE SYSTEM

[75] Inventors: Yoshinori Yamanoi, Wako; Hiroaki Makino, Niiza, both of Japan

[73] Assignee: Honda Giken Kogyo Kabushiki Kaisha, Tokyo, Japan

[21] Appl. No.: 146,475

[22] Filed: Jan. 21, 1988

[30] Foreign Application Priority Data

Jan. 23, 1987 [JP] Japan .................................. 62-13404
Feb. 11, 1987 [JP] Japan .................................. 62-19045

[51] Int. Cl.$^4$ ............................................ F16H 55/06
[52] U.S. Cl. ....................................................... 474/161
[58] Field of Search ............... 474/161, 152, 153, 155; 29/159 R, 159.2

[56] References Cited

U.S. PATENT DOCUMENTS 4,348,199 9/1982 Oonuma et al. ................. 474/161 X

FOREIGN PATENT DOCUMENTS 0177458 11/1982 Japan .................................. 474/161

Primary Examiner—Thuy M. Bui
Attorney, Agent, or Firm—James E. Cockfield

[57] ABSTRACT

A chain drive system is provided having a metallic chain and a metallic sprocket, both meshing with each other. The sprocket is constituted by a double ply or pair of members of the same radius, each having a number of teeth formed at the same pitch on the outer peripheries thereof. An elastic member is held between at least the tooth portions in the chain-mating portions of these ply members. A part of the elastic member projects radially outwardly from at least the bases of the root portions of the split-member defined sprocket to function as elastomeric buffers.

The sprocket may include roller portions capable of making meshing contact with the sprocket teeth. A shaft portion supports each roller portion. Elastic rings member may be formed round the shaft portions so as to project radially outwards beyond the outer periphery of the roller portions.

Portions of the elastic member may project transversely through sprocket wall openings and merge with buffer rims.

Elastic tooth root buffers may be radially and laterally, relatively larger in the base portions of the tooth roots, as opposed to the lateral portions.

10 Claims, 8 Drawing Sheets

FIG. 2
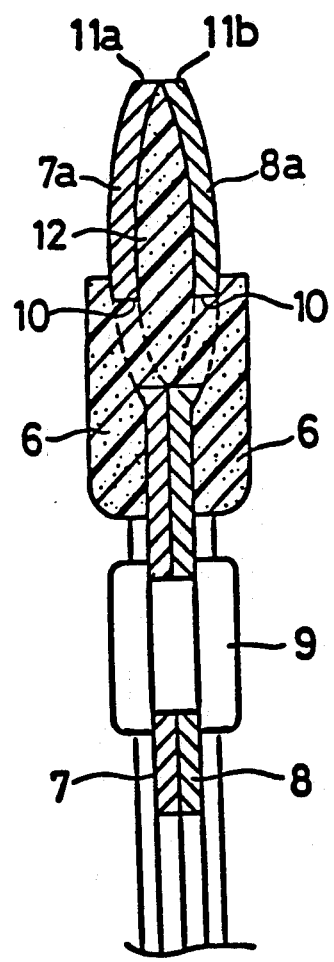
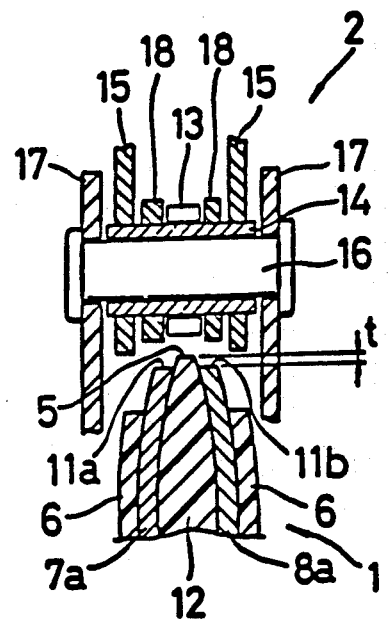
FIG. 3

CHAIN DRIVE SYSTEM

BACKGROUND AND SUMMARY OF INVENTION

The present invention relates to a chain drive system comprising a chain and a sprocket. In this system, an elastic member is provided in the meshing area of the chain and sprocket to serve as a buffer or shock absorber-cushioning means. Particularly, this concept relates to such a chain driving device in which the sprocket is made of two, ply-like members which sandwich, and firmly mount the elastic member mounting of the elastic.

PRIOR ART

In the chain drive system comprising a metallic chain and a metallic sprocket, meshing contact occurs between the metals of these members, thus causing meshing noise and wear. The larger the power to be transmitted, the larger this noise and wear becomes, as in the power transmission gear of a two-wheeled motor vehicle. In an effort to buffer the impact in such meshing, and thus reduce noise and wear, there have been proposed various structures heretofore. For example, a structure in which an elastic member is baked or bonded to the side portions of the sprocket and a structure in which an elastic member is embedded in the tooth bottom portion, are known. Also known is the structure described in Japanese Utility Model Publication No. 45485/79 in which an annular elastic member is provided on a hub formed on each side portion of a sprocket. Since the meshing impact is buffered by these elastic members, the meshing noise is reduced effectively.

However, in the above prior art, if the sprocket with an elastic member provided by bonding or embedding is used over a long period, the elastic member often comes off the sprocket before complete wear thereof and thus there is a certain limit of its durability. Further, when the metallic teeth portion of the sprocket and the chain roller portions are in a state permitting direct contact with each other, there occurs contact between metals, though the degree of the contact may differ, resulting in the occurence of meshing noise or wearing of the teeth. In the sprocket or the like, therefore, the elastic member must be attached more firmly to the tooth surface of the sprocket so as to be more operatively effective in order to attain further improvement of abrasion resistance and reduced noise. It is the object of the present invention to provide such a needed solution.

IMPROVEMENTS PROVIDED BY THE INVENTION

In a first aspect of this invention, a chain drive system is provided having a metallic chain and a metallic sprocket, both meshing with each other. This first aspect of the invention is characterized in that the sprocket is constituted by a double ply or pair of members of the same radius, each having a large number of teeth formed at the same pitch on the outer peripheries thereof. An elastic member is held between at least the tooth portions in the chain-mating portions of these split ply members. A part of the elastic member projects radially outwardly from at least the bases of the root portions of the split-member defined sprocket to function as elastomeric buffers.

Further, a chain drive system according to a second aspect of invention is characterized in that the chain meshing with the sprocket in the first aspect of the invention is constituted by a roller portion capable of making meshing contact with the sprocket teeth. A shaft portion supports the roller portion. Elastic ring means are formed round the shaft portions so as to project radially outwards beyond the outer periphery of the roller portions.

Other independently significant aspects of the invention pertain to portions of the elastic member which project transversely through sprocket wall openings and to buffer rims into which such projections merge.

Additional significance is attached to an embodiment in which the elastic tooth root buffers are radially, and laterally, relatively larger in the base portions of the tooth roots.

In the chain drive systems of this invention, the sprocket is constituted by "split" members of a double ply nature. An elastic member is held at least between the tooth portions in the chain-mating, peripheral portions of the split members. In addition, a part of the elastic member projects from the bases of roots of the teeth to serve as buffer portions, resiliently engageable with the drive chain. With this construction, when the sprocket teeth mesh with the chain during rotation of the sprocket, the chain roller portions first come into contact with the buffer portions of the elastic member. Consequently, the meshing impact is absorbed by such buffer portions to prevent or reduce the occurence of meshing noise. At the same time, the wear against the sprocket teeth is prevented or reduced by the contact of the metallic roller with the elastic buffer portions.

In the second aspect of invention noted earlier, the chain meshing with the sprocket has elastic ring means fitted round the shaft portions which support the roller portions. These elastic ring means project radially outwards beyond the outer periphery of the roller portions. Consequently, when the sprocket and the chain mesh with each other, the elastic buffer portions formed on the sprocket teeth engage the roller portions, and the sprocket teeth tips engage the elastic rings. That is to say the effective contact is buffered by the elastic members. As a result, the function of preventing and/or reducing noise and wear becomes more outstanding.

Moreover, the portions of the elastic (i.e. elastomeric) member which project laterally through ply wall openings serve to effectively anchor the elastic member. The integral merging between the tooth root buffer portions, the anchor projections, and the outer elastic rims on the sprocket contribute to a compact, mutually securing and reinforcing buffering and anchoring network.

At this point, the discussion will be extended to details of presently preferred embodiments which will be discribed with reference to the appended drawings. In this connection, it is to be appreciated that this descriptive discussion is by way of example only, and not limitation.

DRAWINGS

In the appended drawings FIGS. 1 to 3 illustrate one embodiment of the present invention, in which:

FIG. 2 is a sectional view taken on line II—II of FIG. 1,

FIG. 3 is a sectional view taken on line III—III of FIG. 1; and

Figure 1:
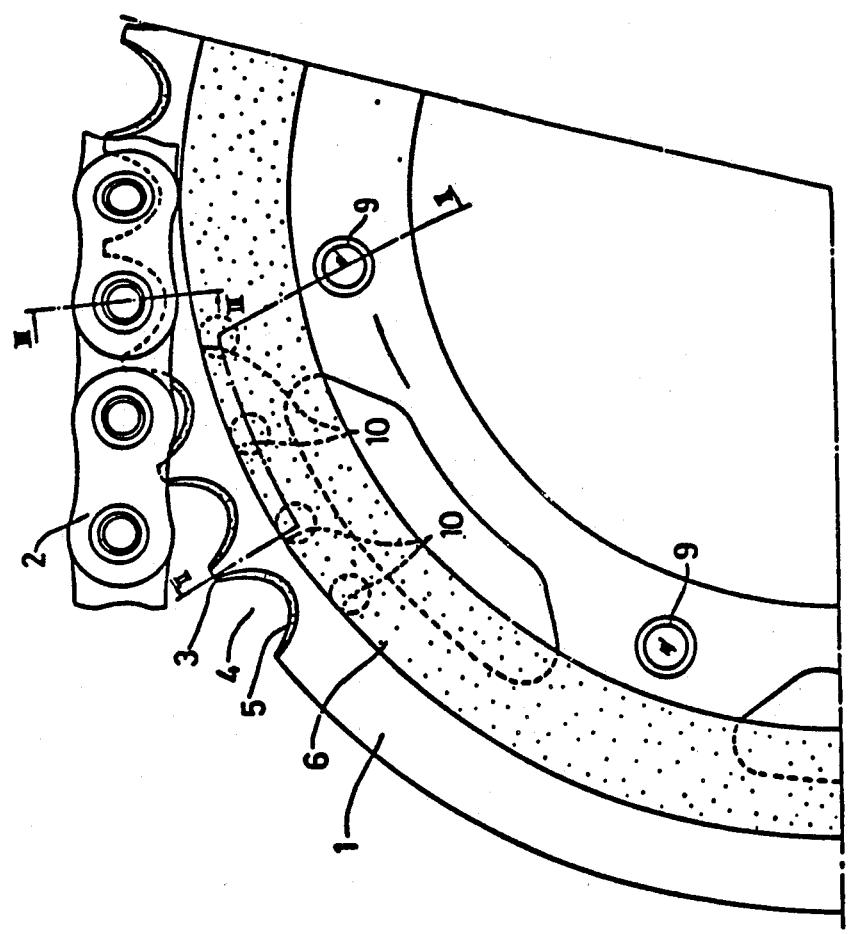
FIG. 1 is a side view of a fragmentary portion of a meshed sprocket and drive chain.

In discussing these embodiments, attention will be called to major component elements as follows:

| Reference Numeral | Component |
| --- | --- |
| 1 | sprocket |
| 2 | chain |
| 3 | tooth |
| 5 | tooth buffer member |
| 6 | side buffer member |
| 7,8 | split or ply members |
| 12 | elastic member |
| 13 | roller portion |
| 14 | shaft |
| 18 | elastic ring |

The appended drawings include additional views pertaining to other aspects of the invention.

Figure 7:
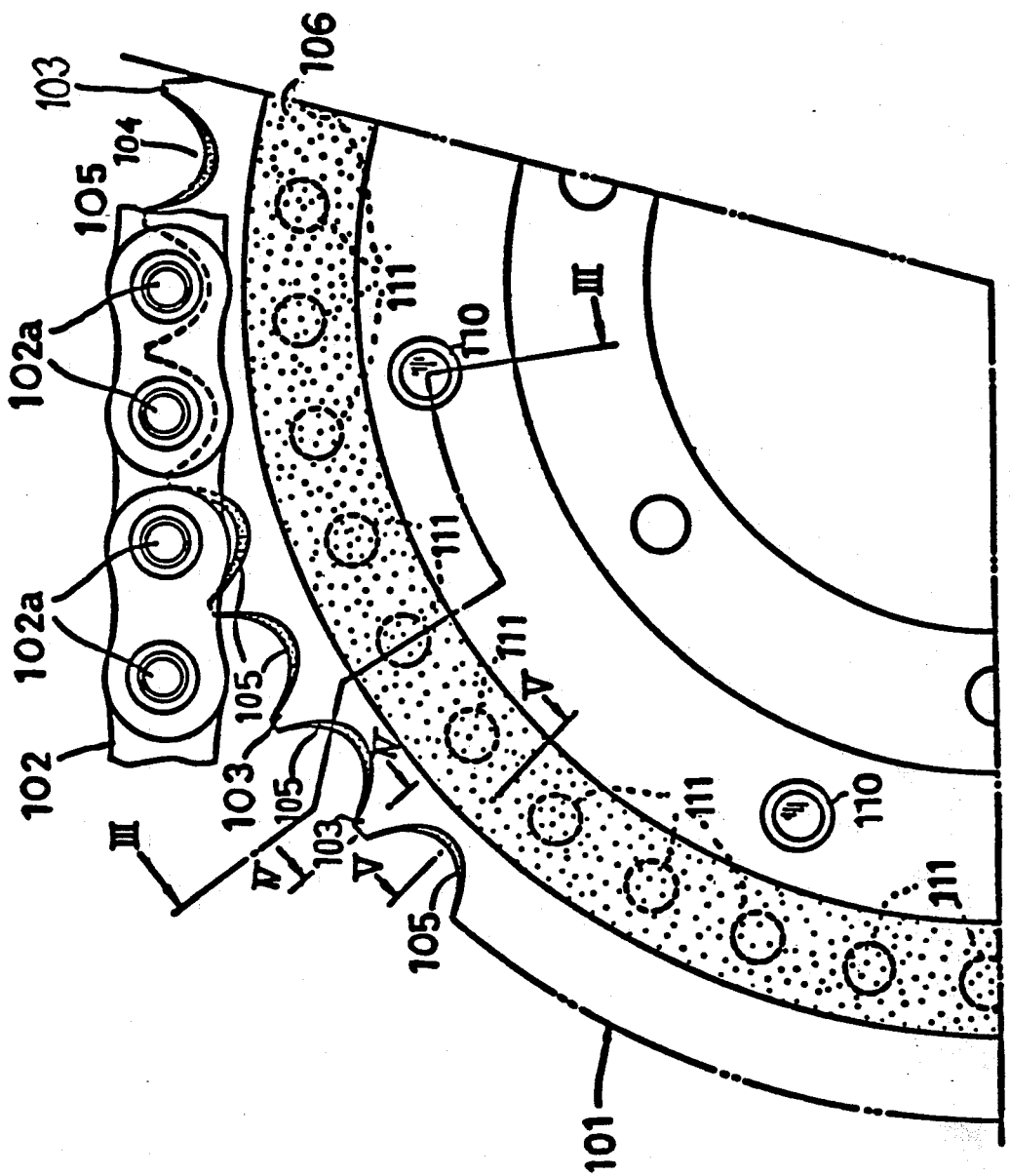
Figure 8:
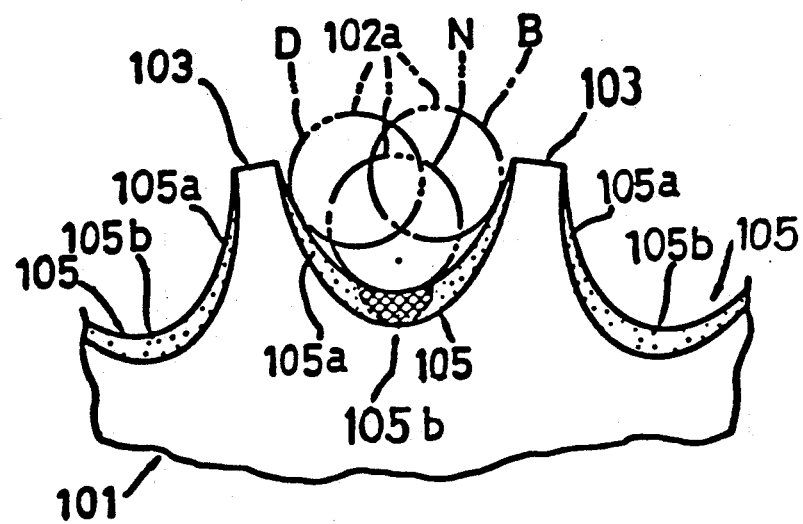
Figure 9:
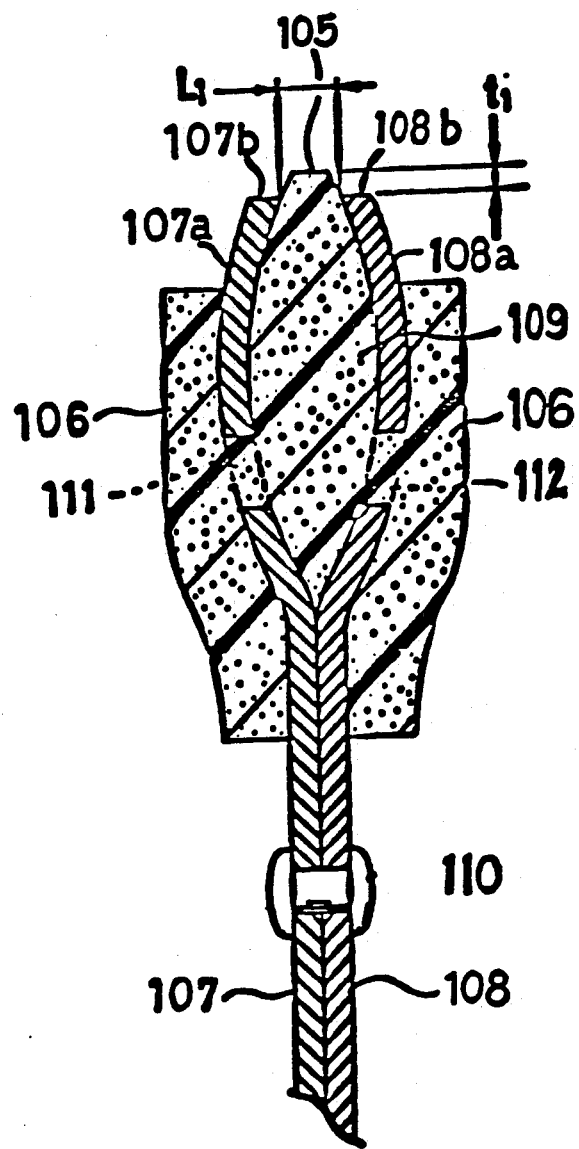
Figure 10:
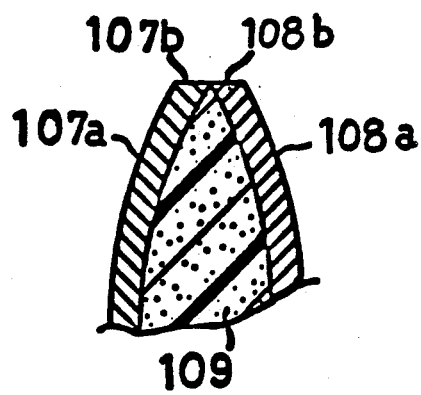
Figure 11:
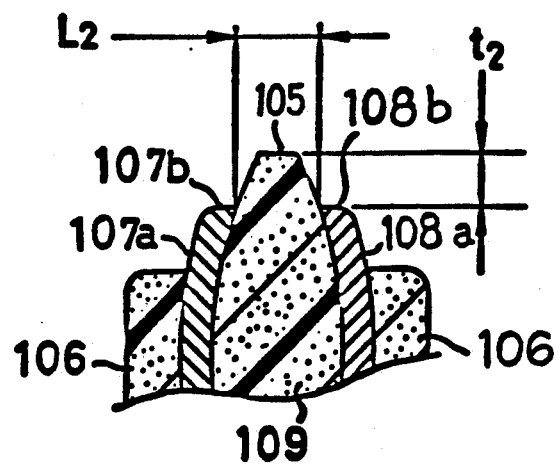

FIGS. 7 to 12 of these views illustrate another embodiment of the invention, in which:

FIG. 7 is a side view of a fragmentary portion of a meshed drive chain and sprocket;

FIG. 8 is a partially enlarged view of FIG. 7,

FIG. 9 is an enlarged sectional view taken on line III—III of FIG. 7,

FIG. 10 is an enlarged sectional view taken on line IV—IV of FIG. 7,

FIG. 11 is an enlarged sectional view taken on line V—V of FIG. 7, and

Figure 12:
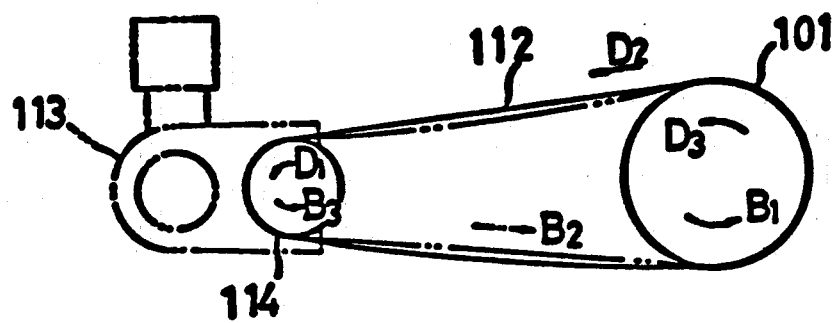

FIG. 12 is a schematic view of a chain drive system.

In describing the embodiments of FIGS. 7-12, particular reference will be made to the following componants:

| Reference Number | Componant |
| --- | --- |
| 101 | sprocket |
| 102 | chain |
| 103 | tooth |
| 105 | tooth buffer member |
| 105a | intermediate or lateral portion of tooth root |
| 105b | tooth root base or side |
| 107, 108 | metallic plates. |
| 109 | intermediate layer. |

At this juncture, it is appropriate to commence the detailed description of presently preferred embodiments of the invention.

DETAILED DESCRIPTION OF PRESENTLY PREFERRED EMBODIMENTS

Referring first to FIGS. 1 to 3, there is illustrated an embodiment of the present invention which is concerned with a chain drive system in a two-wheeled motor vehicle. FIG. 1 is a side view of a portion of the device which illustrates a chain-sprocket meshing area. FIG. 2 shows a section of this sprocket and FIG. 3 shows a section of the chain and the sprocket meshing with each other.

This chain driving device comprises a meshing assembly of a sprocket 1 and a chain 2, both of which are metallic. On the outer periphery of the sprocket 1 there are formed a substantial or large number of teeth 3. Further, elastic tooth buffer members 5, which are relatively thicker at root portions 4 between adjacent teeth 3, are formed on the bases of the roots of each tooth 3.

As shown in FIGS. 1 and 3, these buffers 5 project radially outwardly of the roots of the teeth. The tooth buffer members 5 project a length t from the base surface of each tooth 3, as shown in FIG. 3.

Also, on the side faces of the outer peripheral portions of the sprocket 1, near the tooth roots, there are formed rim-like, side buffer members 6. These members 6 are concentric with the sprocket 1, are elastic and are projected axially outwardly of each sprocket side. The tooth buffer member 5 and/or the side buffer members 6 represent one concrete example of the buffer portion in the present invention. These components will be described in detail later.

As shown in detail in FIG. 2, the sprocket 1 comprises a pair of split or separate ply members 7 and 8 which are symmetric in left and right directions and which are overlapped together in a double-ply or sandwiched fashion and made integral using rivets 9. The split members 7 and 8 are of the same radius and have a large number teeth of the same shape formed at the same pitch on the respective outer peripheries. Therefore, when both are made integral with each other, there are formed integral teeth 3 on the outer periphery of the integral body. If the portions of the split members 7 and 8 which constitute each tooth 3 are assumed to be tooth portions 7a and 8a as illustrated, they are curved or concave in a symmetric form to form a curved centrally enlarged space therebetween when both are overlapped together, as shown in FIG. 2. Further, in side portions of the tooth portions 7a and 8a there are formed inlet openings 10 for communication with the above noted, centrally bulging or enlarged curved space.

Tooth ends 11a and 11b of tooth portions 7a and 7b are cut horizontally in the tooth width direction and a slight spacing is formed in the root areas of mating portions of the two (see FIG. 3), provided that such spacing is not formed in the tooth top portion as shown in FIG. 2. The tooth ends 11a and 11b are made horizontal so as to protect the teeth by making the engaging ends blunt and hence rugged. The tooth portions 7a and 8a can be formed by pressing the portions corresponding to the tooth portions 7a and 8a into a predetermined curved shape when forming the split members 7 and 8 from a steel plate and thereafter punching-in or press forming the concave tooth shape.

To obtain the sprocket 1 formed with the tooth buffer member 5 and the side buffer members 6, the split or separate members 7 and 8 are first overlapped together and then made integral using rivets 9. Then, the outer peripheral sides of the integral body are held between split mold portions. Then a liquid elastomeric resin material for forming an elastic member, for example, is poured from or injected into the inlet openings 10 to pass into the curved space formed by the tooth portions 7a and 8a and may be there hardened by heating. By so doing, an elastic member 12 is formed within the curved tooth space and at the same time a portion of the resin is forced out to the tooth base surface sides from the gaps formed in the mating portion of the tooth portions 7a and 8a so as to form the tooth buffer members 5. Also on the side faces of the outer peripheral portion of the sprocket are formed the side buffer members 6. The elastic member 12 may be formed from any suitable elastic material, e.g. synthetic rubber or any of various synthetic resins, by any suitable method, e.g. injection molding, etc. depending upon the material used.

Referring now to FIG. 3, there is illustrated the chain 2 which is in mesh with the teeth 3. The chain 2 has a cylindrical roller portion 13 capable of meshing in contact with the teeth 3. A longer bushing 14, which serves as a shaft portion for supporting the roller portion 13, is journaled through the roller portion. The end portions of the bushing 14 are passed through holes formed in roller connecting plates 15 and fixed by brazing, welding, or other appropriate fastening means. Moreover, a still longer pin 16 is inserted through the bushing 14 and both end portions thereof are passed through holes formed in pin connecting plates 17 and fixed in position.

Further, on both sides of the roller portion 13 a pair of elastic rings 18 are mounted on the bushing 14. The elastic rings 18 may be formed from the same elastic material as that of the elastic member 12 and are mounted on the roller portion 13 by a suitable method, e.g. thermal or adhesive bonding. Consequently, upon meshing of the chain 2 with the tooth 3, the tooth buffer member 5 and the roller portion 13 come into contact with each other and contact is made also between the elastic rings 18 and the tooth ends 11a and 11b, thus preventing direct contact between metals. As a result, the meshing impact is elastically or resiliently buffered so that the generation of noise is prevented or reduced effectively and the wear of such metallic portions as the tooth portions 7a and 8a and the roller portion 13 is suppressed. In the event of off-center alignment of the sprocket and of the chain due to some cause or the other, and the resulting contact at the side faces of the sprocket 1, the metallic portions on both sides of the roller portion 13 and the upper surfaces of the side buffer members 6 come into resilient or buffering contact with each other. Therefore, also at this portion, direct metallic contact between metals is avoided and a buffering effect is attained.

According to this embodiment, since the tooth ends 11a and 11b are cut horizontally, the distance t between those ends and the top of the tooth buffer member 5 can be made relatively large and so it is possible to attain a greater buffering effect.

Further, the tooth buffer members 5 and the side buffer members 6 are formed integrally with the elastic member 12 formed in the curved space defined by the tooth portions 7a and 8a. Consequently, the area of contact between the buffer members 5, 6 as well as the elastic member 12 and the split ply members becomes extremely large and so it becomes difficult for these buffer members to come off the tooth surface, thus resulting in improvement of durability. Moreover, the portions of the elastomer extending through openings 10 effectively function as anchor points to secure member 12.

Figure 4:
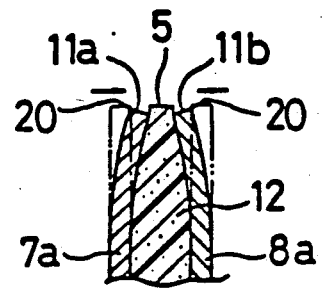
FIGS. 4 to 6 are sectional, transverse views of tooth root portions showing other embodiments.
Figure 5:
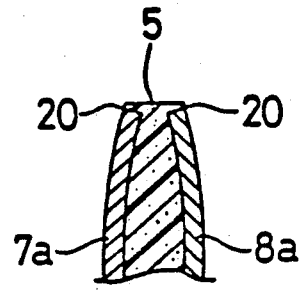
Figure 6:
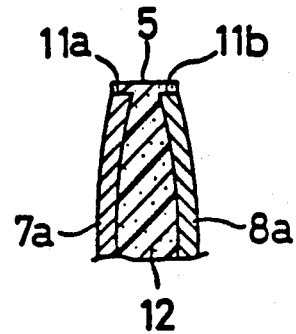

Referring now to FIGS. 4 to 6, there are shown modifications of the tooth buffer member 5 of the above embodiment. Since all of these are mere modifications of the tooth buffer member 5, the portions common to the previous embodiment will be indicated by the same reference numerals and the following explanation will concern sectional structures of teeth shown in the same portion as in FIG. 3.

In the modification shown in FIG. 4, tooth ends 11a and 11b are mutually inclined inwardly with respect to the tooth width direction. This structure is obtained in the following manner. First, a tooth shape is formed by punching from a flat, square ended steel plate and hence the tooth portions 7a and 8a are each in the form of a flat plate indicated by a dash-double dot line. Thereafter, the tooth portions 7a and 8a are pressed, each in a curved concave form, so that a space is formed therebetween when both are sandwiched together. The resulting, centrally enlarged space is then filled with the elastic material and the material set or cured in-situ. This method is advantageous in that the split members which constitute the sprocket can be obtained through the simplest pressing step.

The modification illustrated in FIG. 5 also utilizes the tooth portions 7a and 8a shown in FIG. 4. In this modification, since edge portions 20 which are formed by the inclination of the tooth ends 11a and 11b with respect to the tooth width direction, may be easily deformed at their radial extremities, they are covered with the tooth buffer member material. Consequently, the tooth root base surfaces are covered with the tooth buffer member 5 completely throughout the tooth width, thus eliminating the fear of direct contact between metals and providing protection for the tooth tips. The greater the width of the tooth buffer member 5, the smaller the surface pressure exerted on the tooth buffer member 5 upon contact with the chain 2, such that the wear of this portion is reduced, and the service life is prolonged.

The modification illustrated in FIG. 6 employs tooth portions 7a and 8a whose ends 11a and 11b are horizontal with respect to the tooth width direction, i.e. the direction of the axis of rotation of the sprocket 1, like the case of the embodiment shown in FIGS. 1 to 3. Those end portions are covered with the tooth buffer member 5, as shown in the previous modification of FIG. 5. Consequently, the same protective effect as in the previous modification is obtained. Also, since the tops of the tooth portions 7a and the tooth buffer member 5 are generally flushly bonded together, the surface pressure imposed on the tooth buffer member 5 is more effectively dispersed or buffered so as to ensure prolongation of the service life.

The present invention is not limited to the above embodiment and modifications. Various other modifications and applications may be made. For example, the split members 7 and 8 may each be formed from a simple flat plate shape without curving the tooth portions 7a and 8a of the split members. In this case the tooth buffer members 5 are attached firmly onto the tooth surface as long as the body of the elastic member 12 is interposed between the mating portions of the split members 7 and 8, as opposed to being merely outer surface fixed by baking, for example.

Summarizing the disclosure thus far, it will be appreciated that the sprocket is constituted by two split members of a double ply nature, with an elastic member being interposed or sandwiched between the two. A part of this elastic member is projected at least onto the bases of the tooth roots from gaps formed between both members so as to form buffer portions. Thus, the buffer portions are integral with the elastic member held between the split members. Unlike the case of conventional structures in which the elastic member is merely baked to the sprocket surface, the elastic member is attached extremely firmly to the tooth roots. Therefore, even if the sprocket is used in mesh with the chain over a long period, the buffer portion can be used without exfoliation or breaking away until a predetermined wear limit is reached, thereby resulting in durability being improved to a remarkable extent. Further, since direct contact between metals during the meshing is prevented, the meshing noise can be reduced and the wear of teeth suppressed, whereby further improvement of abrasion resistance and reduction of noise can be attained.

As noted in connection with a second aspect of the invention, elastic rings are fitted on the shaft portions which support the chain roller portions. These elastic rings project radially outwards beyond the outer periphery of the roller portions. Consequently, the elastic members 5 and 18 can cooperate to provide overall, buffered engagement of the sprocket and chain during meshing thereof, so that the noise and wear prevention effects become more outstanding.

The discussion of the invention will now proceed with reference to the improvements illustrated in FIGS. 7 through 12.

In the case where the prior discussed buffer portions project from the tooth surfaces, attention must be paid to localized wear. More particularly, in the portions (hereinafter referred to as "the intermediate portion") extending from the tooth tops to near the tooth roots there buffer portions whose contact with the chain depends on whether the driving condition is a normal condition or a counter-drive condition, such as during engine braking. Since the tooth root base is in contact with the chain in both conditions the tooth root base of the buffer portion is subject to more continuous wear. Therefore, if the buffer portion is formed without any change from the tooth top to the tooth root base, the tooth root base experiences intensified local wear and reaches its limit of use prior to the wearing-out of the lateral or intermediate portions. For the improvement of durability, therefore, it is necessary to prevent the local wear on the tooth root base. Accordingly, it is the object of the present invention to solve this problem and provided a highly durable sprocket.

This solution is achieved by insuring that the amount of projection of the tooth root-base portion of the buffer 5 made larger than that of the intermediate or lateral portions between the tooth root base and the tooth top.

Since, in this concept, the buffer portion projects to a greater extent at the tooth root base than at its intermediate or lateral portions, the degree of wear on the tooth root base and that on the intermediate or lateral portions are averaged so as to prevent or reduce local excessive wear of the tooth root base.

As noted, this embodiment of the present invention is illustrated in FIGS. 7 to 12, which are concerned with a chain driving system in a two-wheeled motor vehicle. FIG. 7 is a side view partially showing a chain-sprocket meshing portion. FIG. 8 is an enlarged view thereof, while FIGS. 9 to 11 are enlarged sectional views of the sprocket tooth portions. FIG. 12 is a schematic view of a chain drive system in a two-wheeled motor vehicle using the sprocket concept of this embodiment.

This chain drive system comprises a metallic sprocket 101 and a metallic chain 102 which are in mesh with each other. As shown in detail in FIG. 8, a large number of teeth 103 are formed on the outer periphery of the sprocket 101. On the tooth surface of each tooth 103 there is formed a tooth buffer member or portion 105 extending from lateral tooth portions to tooth root base portions 104 along the external periphery of the toothed surface.

On the outer side faces of the outer peripheral portions of the sprocket 101 there are formed side buffer members 106, disposed in close radial proximity to the tooth roots. The elastic, side buffer members 106 are concentric with the sprocket 101 and axially outwardly thickened bases. Both the tooth and side buffer members 105 and 106 prevent contact of the metal elements of the sprocket 101 and the chain 102 so as to buffer the meshing impact. The side buffer members 106 are useful in the event the sprocket 101 and the chain 102 are off-centered, due to some cause or the other, resulting in contact of the two at the side faces of the sprocket 101.

As shown in detail in FIG. 9, the sprocket 101 includes a pair of metallic plates 107 and 108 which are symmetric in right and left directions. The metallic plates 107 and 108 are overlapped together in a doubly-ply or sandwich fashion with an intermediate layer 109 of an elastic material held therebetween. The plates are made integral with each other using rivets 110. The metallic plates 107 and 108 are of the same radius and have a large or substantial number of teeth of the same shape formed at the same pitch on the respective outer peripheries.

When the sprocket plates are sandwiched, as shown, there are formed integral teeth 103 on the outer periphery of the integral body. If the facing portions of the metallic plates 107 and 108 which constitute each tooth 103 are assumed to be tooth portions 107a and 108a as illustrated, they are curved in a concave, symmetric form to form a curved, centrally enlarged space therebetween when both are overlapped together. Further, in side portions of the tooth portions 107a and 108a there are formed inlet openings 111 and 112 for communication with the above curved space or cavity. A slight gap is formed in the mating portion of tooth root base edges 107b and 108b of the tooth portions 107a and 108a as shown in FIG. 9. However, this gap is not formed in the tooth tip portions, as is shown in FIG. 10. The intermediate elastic layer 109 is formed within the curved space generally as heretofore described and portions thereof serves as tooth buffer members 105 and the side buffer members 6 which are continuous as an integral body.

As shown in FIGS. 8, 9 and 10, the tooth buffer portions 105 are larger in the amount of radial projection and lateral width at the tooth root bases 105b than at an intermediate portion 105a. More specifically, if the amount of projection and width of the intermediate portion 105a are $t_1$ and $L_1$ and those of the tooth root base 105b are $t_2$ and $L_2$, there exists the following relations: $t_1 < t_2$, and $L_1 < L_2$.

The method of making the sprocket 101 will now be explained.

Steel plates are pressed and punched in a toothed shape so that the portions thereof corresponding to the tooth portions 107a and 108a are formed in a predetermined curved shape. The metallic plates 107 and 108 thus obtained are overlapped or sandwiched together so that a curved space or cavity is formed by the tooth portions 107a and 108a. These plates are made integral with each other using rivets 110 to form metallic portions of the sprocket 101. Then, the outer peripheral sides of this integral body are held between split mold portions (not shown) and, for example, a liquid resin material for forming an elastomeric member is poured through or injected into the inlet openings 111 and 112 so as to pass into the curved space formed by the tooth portions 107a and 108a. This material may be hardened by heating. By so doing, the intermediate elastomeric layer 109 is formed in-situ within the curved space. In this case, since molding surfaces corresponding to the tooth buffer members 105 and the side buffer members 106 are preformed on the surfaces of the split molding portions, a portion of the elastic material which constitutes the intermediate layer 109 is forced out to the tooth surface side from the gaps formed in the mating portion of the tooth portions 107a and 108a so as to form the tooth buffer members 105. At the same time the side buffer members 106 are formed integrally on the outer side faces of the outer peripheral portion of the sprocket. As shown in FIG. 10, however, the tooth buffer members 105 are not formed at the tooth top portions because the elastic material is not forced out there. The intermediate layer 109 may be formed from any suitable elastic material, e.g. synthetic rubber, or any of various synthetic resins.

The operation of this embodiment will now to be explained. FIG. 12 is a schematic view of a chain drive system in a two-wheeled motor vehicle, in which the chain 102 is stretched between and round a driving-side sprocket 114 attached to an engine 113 and the driven-side sprocket 101. In normal operation, the power of the engine is input from the driving sprocket 114, causing the latter to turn in the direction of arrow $D_1$, so this driving force is transmitted to the chain 102 and sprocket 101, which in turn rotate in the direction of arrows $D_2$ and $D_3$, respectively. On the other hand, when input is made from the sprocket 101 side and this sprocket experiences a driving force in the direction of arrow $B_1$, the driving forces is transmitted to the chain 102 and the driving-side sprocket 114, which are thereby rotated in the directions of arrows $B_2$ and $B_3$, respectively, resulting in that there occurs a change in the meshing state of the sprocket 101 and the chain 102, depending on whether the driving condition is normal condition or a counter drive condition.

This point will now be explained with reference to FIG. 8. First, in normal drive condition, the teeth 103 of the sprocket 101 and the chain 102 mesh with each other and the sprocket 101 rotates in the arrowed direction, so that a roller portion 102a of the chain 102 moves from a neutral position indicated by the reference mark N to a drive position indicated by the reference numeral D. Consequently, the position of contact of a roller portion 102a and the tooth buffer member 105 shifts from the tooth root base 105b to one side (left side of tooth 103 as shown) of the intermediate portion 105a and the transmission of the driving force is effected under this movement. In a counter-drive condition such as during engine braking, the roller portion 102a is initially a counter-drive position, indicated by the reference numeral B, and then moves to the neutral position N with decrease of input, so that the position of contact of the roller portion 102a and the tooth buffer member 105 shifts through the tooth root base 105b to the opposite side (left side of each tooth shown) of the intermediate portion 105a. Therefore, if the sprocket is used over a long period while repeating normal and counter drive conditions, the tooth buffer member 105 will tend to become worn due to its frictional contact with the roller portion 102a. In this case, the wear of the tooth root side 105b is to a greater extent at the lateral or intermediate positions because load is imposed thereon from the roller portion 102a at all times. But since this portion is larger in the amount of radial projection and width than the intermediate portion 105a as previously noted, the rate of wear of the tooth buffer member 105 is rendered more uniform as a whole from the intermediate portions 105a to the tooth base portions 105b, resulting in the improved durability of the tooth buffer members 105.

Moreover, in this embodiment, since not only the amount of projection but also the width of the tooth buffer member 105 is varied, the volume of the tooth root base 105b can be made adequately large even if the amount of projection thereof is not made so large. Consequently, it is possible to prevent weakening of the tooth root base 105b. Further, the tooth and side buffer members 105 and 106 are formed integrally with the intermediate layer 109, which is formed within the curved space between the tooth portions 107a and 108a, so that the areas of supporting contact between the buffer members 105, 106 as well as the intermediate layer 109 and the metallic plates 107, 108 become extremely large. This results in the buffer members 105 and 106 becoming especially resistant to displacement off of the tooth surfaces, thus attaining improvement of durability.

Having described the invention in various embodiments, those skilled in this art and familiar with this disclosure will doubtless recognize additions, deletions, reversals, substitutions, modifications, or equivalents which would fall within the scope of the invention as defined in the appended claims.

What is claimed is:

1. In a chain drive system comprising
    a metallic drive chain and
    a sprocket meshingly engaged with said drive chain,
the improvement wherein:
    said sprocket includes two, at least partially spaced, ply members of generally the same radius,
        each having a toothed portion including a substantial number of teeth of substantially the same shape formed at the same pitch on the outer peripheries thereof, with teeth of said ply members being disposed in axially spaced but mutually aligned relation relative to an axis of rotation of said sprocket; and
    an elastic member is secured between at least the spaced toothed portions of said two sprocket ply members in the toothed portions of said ply members, with
        parts of said elastic member projecting radially outwardly of the spaced tooth root portions to form resilient buffer portions engageable with teeth of said drive chain;
    said elastic member providing, as an integrally interconnected, elastic body,
        first, elastic chain buffer means
            defined by said resilient buffer portions, and
            extending radially outward of radial extremities of said sprocket ply members defining said root portions, and
        elastic anchoring means secured between said ply members;
    said anchoring means and chain buffer means being elastic and integrally interconnected;
    said toothed portions of said ply members including outer extremity portions which define mutually converging walls operable to restrict axially outermost portions of said elastic member;
    said toothed portions of said ply members including inner portions which define mutually converging walls operable to restrict radially innermost portions of said elastic member; and
    said ply members providing axially displaced openings on opposite sides of said ply members through which elastomeric anchoring plug means, integral with said elastic member, project in generally axially opposite directions to provide elastic anchoring on each side of said elastic member.

2. A chain drive system according to claim 1 wherein:
said toothed portions have mutually contacting tooth tip extremity portions alternating circumferentially with said tooth root portions,
said contacting tooth tip portions enclosing extremity portions of said elastic member.

3. A chain system according to claim 1 wherein:
said toothed portions are concave in mutually facing directions and define generally closed base cavities shaped to conformingly receive toothed portions of said elastic member.

4. A chain system according to claim 1 wherein:
saide portions of said tooth portions of said ply members include laterally directed openings,
said elastic member includes portions projecting laterally outwardly of said openings.

5. A chain drive system according to claim 1 wherein:
said sprocket includes elastic side buffer means elastically engageable with said drive chain,
said side buffer means extending integrally from said portions of said elastic member which project laterally outwardly of said laterally directed openings of said ply members.

6. A chain drive system according to claim 1 wherein:
said metallic drive chain includes
roller portions meshingly engageable with said buffer portions,
shaft members supporting said roller members, and
elastic ring means mounted on said shaft members, projecting radially beyond said roller portions, and engageable with peripheral portions of said ply members.

7. A chain drive system according to claim 1 wherein said resilient buffer portions projecting radially outwardly of said tooth root portions include:
first, base portions disposed in the radially innermost portions of said root portions; and
second, lateral portions disposed radially outwardly of said innermost portions;
said first, base portions projecting further from said root portions of said ply members than said second, lateral portions and being relatively thicker, in the axial direction of said sprocket.

8. In a chain drive system comprising
a metallic drive chain and
a sprocket meshingly engaged with said drive chain, the improvement wherein:
said sprocket includes two, at least partially spaced, ply members of generally the same radius,
each having a toothed portion including a substantial number of teeth of substantially the same shape formed at the same pitch on the outer peripheries thereof, with
teeth of said ply members being disposed in axially spaced but mutually aligned relation relative to an axis of rotation of said sprocket; and
an elastic member is secured between at least the spaced toothed portions of said two sprocket ply members in the toothed portions of said ply members, with
parts of said elastic member projecting radially outwardly of the spaced tooth root portions to form resilient buffer portions engageable with teeth of said drive chain;
said resilient buffer portions projecting radially outwardly of said tooth root portions include
first, base portions disposed in the radially innermost portions of said root portions, and
second, lateral portions disposed radially outwardly of said innermost portions;
said first, base portions projecting further from said root portions of said ply members than said second, lateral portions and being relatively thicker, in the axial direction of said sprocket;
said elastic member providing, as an integrally interconnected, elastic body,
first, elastic chain buffer means
defined by said resilient buffer portions, and
extending radially outward of radial extremities of said sprocket ply members defining said root portions, and
elastic anchoring means extending between said ply members;
said anchoring means and chain buffer means being elastic and integrally interconnected;
said toothed portions of said ply members including outer extremity portions which define mutually converging walls operable to restrict axially outermost portions of said elastic member;
said toothed portions of said ply members including inner portions which define mutually converging walls operable to restrict radially innermost portions of said elastic member; and
said ply members providing axially displaced openings on opposite sides of said ply members through which elastomeric anchoring plug means, integral with said elastic member, project in generally axially opposite directions to provide elastic anchoring on each side of said elastic member.

9. In a chain drive system comprising
a metallic drive chain and
a sprocket meshingly engaged with said drive chain, the improvement wherein:
said sprocket includes two, at least partially spaced, ply members of generally the same radius,
each having a toothed portion including a substantial number of teeth of substantially the same shape formed at the same pitch on the outer peripheries thereof, with
teeth of said ply members being disposed in axially spaced but mutually aligned relation relative to an axis of rotation of said sprocket;
an elastic buffer member is secured at least in part between at least the spaced toothed portions of said two sprocket ply members in the toothed portions of said two sprocket ply members in the toothed portions of said ply members;
said portions of said tooth portions of said ply members include laterally directed openings; and
said elastic buffer member includes elastic portions projecting laterally outwardly of said openings;
said elastic member providing, as an integrally interconnected, elastic body,
first, elastic chain buffer means
defined by said resilient buffer portions, and
extending radially outward of radial extremities of said sprocket ply members defining said root portions, and
elastic anchoring means extending between said ply members and including said elastic portions;
said anchoring means and chain buffer means being elastic and integrally interconnected;
said toothed portions of said ply members including outer extremity portions which define mutually converging walls operable to restrict axially outermost portions of said elastic member;

said toothed portions of said ply members including inner portions which define mutually converging walls operable to restrict radially innermost portions of said elastic member; and said ply members providing axially displaced openings on opposite sides of said ply members through which elastomeric anchoring plug means, integral with said elastic member, project in generally axially opposite directions to provide elastic anchoring on each side of said elastic member.

10. A chain drive system according to claim 9 wherein:

said sprocket includes elastic side buffer means elastically engageable with said drive chain, said side buffer means extending integrally from said portions of said elastic member which project laterally outwardly of said laterally directed openings of said ply members.

* * * * *